United States Patent
Wosylus et al.

(10) Patent No.: US 9,701,844 B2
(45) Date of Patent: Jul. 11, 2017

(54) PROCESS FOR PREPARING METAL OXIDE COATED ALUMINIUM EFFECT PIGMENTS

(71) Applicant: BASF SE, Ludwigshafen (DE)

(72) Inventors: Aron Wosylus, Bad Duerkheim (DE); Raimund Schmid, Neustadt (DE)

(73) Assignee: BASF SE, Ludwigshafen (DE)

( * ) Notice: Subject to any disclaimer, the term of this patent is extended or adjusted under 35 U.S.C. 154(b) by 53 days.

(21) Appl. No.: 14/397,721

(22) PCT Filed: May 10, 2013

(86) PCT No.: PCT/IB2013/053803
§ 371 (c)(1),
(2) Date: Oct. 29, 2014

(87) PCT Pub. No.: WO2013/175339
PCT Pub. Date: Nov. 28, 2013

(65) Prior Publication Data
US 2015/0104573 A1    Apr. 16, 2015

Related U.S. Application Data

(60) Provisional application No. 61/649,943, filed on May 22, 2012.

(30) Foreign Application Priority Data

May 22, 2012 (EP) .................................. 12168821

(51) Int. Cl.
C09C 1/64 (2006.01)
C09C 1/00 (2006.01)
C09C 3/06 (2006.01)

(52) U.S. Cl.
CPC ............ *C09C 1/642* (2013.01); *C09C 1/0015* (2013.01); *C09C 1/0018* (2013.01); *C09C 1/0021* (2013.01); *C09C 1/0081* (2013.01); *C09C 3/063* (2013.01); *C01P 2004/54* (2013.01); *C09C 2200/102* (2013.01)

(58) Field of Classification Search
CPC ..... C09C 1/0021; C09C 1/0081; C09C 1/642; C09C 2200/102
See application file for complete search history.

(56) References Cited

U.S. PATENT DOCUMENTS

| 3,014,810 A | * | 12/1961 | Dybalski | C08K 9/04 106/453 |
| 5,277,711 A | * | 1/1994 | Schmidt | A61K 8/26 106/404 |
| 5,352,286 A | * | 10/1994 | Schmid | C09C 1/62 106/453 |
| 5,562,763 A | * | 10/1996 | Bruckner | C09B 63/00 106/403 |
| 5,763,086 A | | 6/1998 | Schmid et al. | |
| 6,517,629 B2 | | 2/2003 | Kinniard | |
| 2004/0194663 A1 | * | 10/2004 | Li | A61K 8/19 106/403 |
| 2007/0034112 A1 | * | 2/2007 | Mronga | C09C 1/0015 106/31.6 |
| 2007/0104663 A1 | * | 5/2007 | Henglein | C09C 1/0015 424/61 |
| 2008/0139735 A1 | * | 6/2008 | Reisacher | C07D 301/32 524/507 |
| 2008/0295737 A1 | * | 12/2008 | Henglein | C09C 3/10 106/421 |
| 2010/0011992 A1 | * | 1/2010 | Bujard | B82Y 30/00 106/439 |
| 2011/0197782 A1 | * | 8/2011 | Wang | B82Y 30/00 106/31.9 |

FOREIGN PATENT DOCUMENTS

| CN | 1775869 | 5/2006 |
| CN | 1903943 | 1/2007 |
| CN | 101921498 | 12/2010 |
| CN | 102199367 | 9/2011 |
| DE | 44 05 492 | 8/1995 |
| EP | 0 033 457 | 8/1981 |
| EP | 0 078 154 | 5/1983 |
| EP | 0 562 329 A1 | 9/1993 |
| EP | 0 688 833 | 12/1995 |
| EP | 0 768 343 A2 | 4/1997 |
| EP | 1 682 622 | 7/2006 |
| EP | 1 904 587 | 4/2008 |
| JP | S54-81337 A | 6/1979 |
| JP | H06-016965 A | 1/1994 |
| WO | 02 064683 | 8/2002 |
| WO | 03/014228 A1 | 2/2003 |

OTHER PUBLICATIONS

International Search Report Issued Oct. 17, 2013 in PCT/IB13/053803 Filed May 10, 2013.
Supplemental European Search Report issued Feb. 19, 2016 in European Patent Application No. 13794150.6.
Decision to Grant issued Nov. 28, 2016 in Japanese Patent Application No. 2015-513307 with English translation.

\* cited by examiner

*Primary Examiner* — Erma Cameron
(74) *Attorney, Agent, or Firm* — Oblon, McClelland, Maier & Neustadt, L.L.P.

(57) ABSTRACT

The present invention relates to a process for preparing a colored effect pigment, comprising: (i) coating aluminum-based substrate particles in an aqueous coating medium with at least one metal oxide layer, wherein the metal oxide is selected from a titanium oxide, an iron oxide, or any mixture thereof, (ii) providing a mixture of the coated aluminum-based substrate particles and a particulate inorganic non-metallic material in the aqueous coating medium by adding the particulate inorganic non-metallic material to the aqueous coating medium, and (iii) separating the mixture of the coated aluminum-based substrate particles and the particulate inorganic non-metallic material from the aqueous coating medium and subjecting the separated mixture to a thermal drying step so as to obtain a dry colored effect pigment material.

14 Claims, No Drawings

PROCESS FOR PREPARING METAL OXIDE COATED ALUMINIUM EFFECT PIGMENTS

CROSS REFERENCE TO RELATED APPLICATIONS

The present application is the national stage of PCT/IB13/053803, filed May 10, 2013, the disclosure of which is incorporated herein by reference in its entirety. The parent application is the non-provisional application of U.S. Application No. 61/649,943, filed May 22, 2012, the disclosure of which is incorporated herein by reference in its entirety. PCT/IB13/053803 claims priority to European Application No. 12168821.2, filed May 22, 2012, the disclosure of which is incorporated herein by reference in its entirety.

BACKGROUND OF THE INVENTION

Luster or effect pigments are used in many areas, for example in automotive coatings, decorative coatings, plastics pigmentation, paints, printing inks, and cosmetics.

The optical effect is based on the directed reflection of light at predominantly sheet-like, parallel-oriented, metallic or strongly refractive pigment particles. Depending on the composition of the pigment platelets, there are interference, reflection and absorption phenomena which create angular-dependent color and lightness effects.

Metallic effect pigments are all of the platelet-shaped substrates known to the skilled person, examples being aluminium platelets/flakes or metal oxide-coated aluminium platelets/flakes.

Platelet-shaped aluminium pigments having a coating of iron oxide are well known and described e.g. in EP 0 033 457. They belong to the class of effect pigments which, by virtue of their particular color properties, have found wide use in the coloration of coatings, paints, printing inks, plastics, ceramic compositions and glazes and decorative cosmetic preparations.

Iron oxide coated aluminium pigments derive their particular optical profile from a combination of specular reflection at the surface of the aluminium platelet, selective light absorption in the iron oxide layer and light interference at the film-like surfaces of the iron oxide layer. Light interference leads to a color which is mainly determined by the thickness of the iron oxide coating layer. Dry pigment powders therefore exhibit the following hues in air with increasing iron oxide layer thickness which are classified as due to 1st order or 2nd order interference:
1st order interference colors: pale yellow, green-gold, gold, reddish-gold, red, violet, grayish-violet;
2nd order interference colors: yellow, gold, reddish-gold, red-gold, red.

Iron oxide coated aluminium pigments are very bright and opaque, which is why they are widely used in automotive coatings. The pigments customarily used in this field are based on aluminium platelets and exhibit a metallic mirror effect.

Metal oxide layers of effect pigments can be provided on the metallic substrate particles by gas phase decomposition of volatile metal compounds in the presence of oxygen and/or water vapor or by a wet-chemical coating process (e.g. sol-gel process).

EP 0 033 457 A2 describes a process for the preparation of colored effect pigments comprising a metallic substrate whose surface is at least partially covered with an iron oxide, wherein iron pentacarbonyl is oxidized to iron oxide in a fluidized bed of the metallic substrates with oxygen at above 100° C.

In wet-chemical preparation methods, metal oxide containing layers can be applied by hydrolytic reaction of appropriate metal salts, e.g. iron(III) salts such as iron(III) chloride and sulfate, or hydrolysable organometallic compounds.

Details about the preparation of a metal oxide coating layer on a metal-based substrate of an effect pigment are provided e.g. in EP 0 708 154 A2.

Typically, a metal oxide layer prepared via a wet-chemical preparation method may contain hydroxyl groups due to incomplete condensation reaction of hydrolysed precursor species or bound water. For coloristic reasons, conversion of the hydroxide-containing oxide layer into the fully condensed oxide layer and/or removal of bound water is preferred so as to avoid any undesired pigment color shift in the applied pigment-containing product. This is typically accomplished by drying in a hot gas stream.

However, if the metal substrate of the effect pigment comprises aluminium, such a drying step may trigger an aluminothermic reaction.

Aluminothermic reactions are highly exothermic chemical reactions between aluminium acting as a reducing agent and a metal oxide such as iron oxide or titanium oxide. The most prominent example is the thermite reaction between aluminium and iron oxide. However, aluminium may also react with a titanium oxide or other oxides such as $SiO_2$.

BRIEF SUMMARY OF THE INVENTION

It is an object of the present invention to provide a process for preparing an effect pigment comprising an aluminium-based metal substrate and an iron oxide or titanium oxide layer, said process minimizing the risk of initiating an aluminothermic reaction and being easy to perform but still resulting in an effect pigment having stable coloristic properties.

DETAILED DESCRIPTION OF THE INVENTION

According to a first aspect of the present invention, the object is solved by a process for preparing a coloured effect pigment, comprising:
(i) coating aluminium-based substrate particles in an aqueous coating medium with at least one metal oxide layer, wherein the metal oxide is selected from a titanium oxide, an iron oxide, or any mixture thereof,
(ii) providing a mixture of the coated aluminium-based substrate particles and a particulate inorganic non-metallic material in the aqueous coating medium by adding the particulate inorganic non-metallic material to the aqueous coating medium, and
(iii) separating the mixture of the coated aluminium-based substrate particles and the particulate inorganic non-metallic material from the aqueous coating medium and subjecting the separated mixture to a thermal drying step so as to obtain a dry coloured effect pigment material.

In the present invention, it has been realized that the combination of a wet coating process in combination with a step of mixing the aluminium-based effect pigment particles with appropriate inorganic particles in the liquid coating medium results in a manufacturing method which minimizes the risk of initiating an aluminothermic reaction and is easy to perform but still provides an effect pigment having stable coloristic properties.

Appropriate aluminium-based substrate particles for preparing a coloured effect pigments are generally known to the skilled person.

The aluminium-based substrate particles can be made of an aluminium or aluminium alloy core which may at least partly be coated with one or more passivation layers.

The aluminium or aluminium alloy core is preferably in the form of platelets or flakes.

As an exemplary aluminium alloy, aluminium bronze can be mentioned.

The aluminium or aluminium alloy platelets or flakes are producible in a simple manner by breaking out or cutting out of foils or by common atomizing and grinding techniques. Suitable aluminium or aluminium alloy platelets are produced for example by the Hall process by wet grinding in white spirit. The starting material is an atomized, irregular aluminium grit which is ball-milled in white spirit and in the presence of lubricant into platelet-shaped particles and subsequently classified. Average thickness and average diameter of aluminium or aluminium alloy platelets or flakes can be varied over a broad range. Typically, average thickness of the platelets or flakes can be within the range of 10 nm to 1000 nm, and average diameter can be within the range of 8 μm to 50 μm. Typically, the ratio of average diameter to average thickness can be within the range of 30 to 5000.

As mentioned above, the aluminium or aluminium alloy core of the aluminium-based substrate particles can at least partly be coated with one or more passivation layers.

Appropriate passivating layers are generally known to the skilled person. The passivating layer is preferably an inorganic layer such as a metal phosphate layer, or an inorganic oxide layer. If the inorganic passivating layer is a metal phosphate layer, the metal can be selected from Ti, V, Cr, Mn, Fe, Co, Ni, Cu, Zn, Al, Zr, Nb, Mo, Ta or W. If the inorganic passivating layer is an inorganic oxide layer, the oxide can be selected from Ti, V, Cr, Mn, Fe, Co, Ni, Cu, Zn, Al, Zr, Nb, Mo, Ta, W, Ge, Si, Sn and Bi oxides or any combinations thereof.

Methods for preparing a passivating layer on an effect pigment substrate such as aluminium platelets are generally known to the skilled person.

In principle, a passivating layer can be produced by a wet-chemical method or a chemical vapour deposition (CVD) method.

In the wet-chemical process, appropriate precursor compounds such as organic silicon and/or aluminium compounds in which the organic groups are bonded to the metals via oxygen atoms are hydrolyzed in the presence of the substrate particles (e.g. aluminium flakes or platelets) and of an organic solvent in which the metal compounds are soluble. Preferably, a metal alkoxide (especially tetraethoxysilane and aluminium triisopropoxide) is hydrolyzed in the presence of an alcohol (e.g. ethanol or isopropanol) and a basic or acid catalyst (e.g. aqueous ammonia and/or amines). This is preferably done by initially charging substrate particles, isopropanol, water and ammonia, heating this mixture to from 40° C. to 80° C., with stirring and continuously adding a solution of the metal alkoxide in isopropanol. Following a subsequent stirring time of usually from 1 to 15 h, the mixture is cooled down to room temperature, and the coated pigment is isolated by filtering off, washing and optionally drying. Further details about the method of preparing a passivating layer on aluminium are provided e.g. in EP 0 708 154 A2 and DE 4405492 A.

The step of providing a layer of an iron oxide or titanium oxide on an aluminium-based substrate (either directly on the aluminium and aluminium alloy, respectively, or on a passivating layer which in turn was applied onto the aluminium or aluminium alloy) in an aqueous coating medium is generally known to the skilled person.

A metal oxide layer can be provided by adding an appropriate metal oxide precursor compound such as a metal salt or organometallic compound or other hydrolysable precursor compounds to the aqueous coating medium comprising the aluminium-based substrate particles which may optionally be coated by at least one passivating layer.

The term "aqueous coating medium" means that the liquid medium contains water in an amount which is sufficient for hydrolyzing the precursor compound and accomplishing condensation of the hydrolyzed species so as to apply a coating on the substrate particles. Appropriate amounts of water are known to the skilled person or can easily be established by routine experimentation. Typically, the aqueous coating medium contains water in an amount of from 50 wt % to 100 wt %, based on the total amount of liquids in the aqueous coating medium.

The metal oxide layer can be applied onto the substrate particles at acidic or alkaline pH. Preferably, pH of the aqueous coating medium is kept constant while adding or dosing the metal oxide precursor compound to the aqueous coating medium.

While providing (e.g. by precipitation) the metal oxide layer on the substrate particles, temperature of the aqueous coating medium can be varied over a broad range, such as room temperature to 100° C., or 30 to 100° C.

The iron or titanium oxide layer can have a thickness which results in a colour according to 1st order or 2nd order interference series.

If the layer thickness of the iron oxide coating is within a range which results in 1st order interference colours, these colours can be pale yellow, green-gold, gold, reddish-gold, red, violet, or grayish-violet. If the layer thickness of the iron oxide coating is within a range which results in 2nd order interference colours, these colours can be yellow, gold, reddish-gold, red-gold, or red.

Typically, a metal oxide layer (such as an iron oxide or titanium oxide layer) provided on a substrate via a wet-chemical process step still includes hydroxyl groups, due to incomplete condensation between the hydrolyzed precursor species and/or the presence of water. If the metal is iron(III), the metal oxide obtained via the wet-chemical method is typically not only present in the "fully condensed" oxide form $Fe_2O_3$ but also comprises to some extent hydrated iron oxide or iron oxide hydroxide. The iron oxide hydroxide or hydrated iron oxide still contains hydroxyl groups and can be expressed e.g. by the formula FeO(OH).

Thus, the iron oxide or titanium oxide layer prepared in step (i) also encompasses those metal oxides still containing hydroxyl groups due to incomplete condensation during the formation of the metal oxide solid, and/or due to the presence of water. The hydroxyl groups can be distributed over the entire metal oxide, or can be present in some areas of the metal oxide only while the other areas, due to complete condensation, do not contain hydroxyl groups anymore. If not specifically indicated, the term "iron oxide" encompasses any stoichiometric ratio between iron and oxygen that may exist in commonly known iron oxides. The same applies to the term "titanium oxide".

If the iron oxide still contains hydroxyl groups, it can be selected from a hydrated iron oxide, an iron oxide hydroxide, or any mixture of iron oxide such as $Fe_2O_3$ or $Fe_3O_4$ with a hydrated iron oxide and/or an iron oxide hydroxide.

Preferably, Fe atoms are present as Fe(III). However, within the present invention, Fe atoms may also be present as Fe(II) and/or Fe(IV).

The hydrated iron oxide or iron oxide hydroxide can be represented by one of the following formulas:

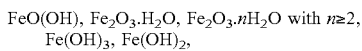

$FeO(OH)$, $Fe_2O_3 \cdot H_2O$, $Fe_2O_3 \cdot nH_2O$ with $n \geq 2$, $Fe(OH)_3$, $Fe(OH)_2$, or can be a mixture of two or more of these hydroxyl-containing iron oxides.

The iron oxide can be crystalline or amorphous, and can be a stoichiometric-type or non-stoichiometric-type oxide.

If the titanium oxide still contains hydroxyl groups, it can be selected from a hydrated titanium oxide, a titanium oxide hydroxide, or any mixture of titanium dioxide $TiO_2$ with a hydrated titanium oxide and/or an titanium oxide hydroxide Preferably, Ti atoms are present as Ti(IV). However, within the present invention, Ti atoms may also be present as Ti(III).

The hydrated titanium oxide or titanium oxide hydroxide can be represented by one of the following exemplary formulas:

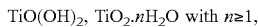

$TiO(OH)_2$, $TiO_2 \cdot nH_2O$ with $n \geq 1$, or can be a mixture of two or more of these hydroxyl-containing titanium oxides.

The titanium oxide or titanium oxide hydroxide can be crystalline or amorphous, and can be a stoichiometric-type or non-stoichiometric-type oxide.

As indicated above, the process of the present invention comprises a step (ii) of providing a mixture of the coated aluminium-based substrate particles and a particulate inorganic non-metallic material in the aqueous coating medium by adding the particulate inorganic non-metallic material to the aqueous coating medium The particulate inorganic non-metallic material can be added to the aqueous coating medium during or subsequent to step (i). However, in the present invention, it is also possible that the aqueous coating medium already contains the particulate inorganic non-metallic material before coating step (i) is started.

Inorganic non-metallic solids which are useful for the present invention can be selected from flaky or layered silicates or phyllosilicates, aluminium oxides, aluminosilicates, glass, synthetic mica, perlite, borosilicate glass, or any mixture of these.

A preferred phyllosilicate or sheet or layered silicate is mica. Mica is commonly known to the skilled person and commercially available. In the present invention, synthetic mica as well as naturally occurring mica can be used. Exemplary mica materials that can be mentioned include e.g. phlogopite and fluoro phlogopite.

The average particle size of the inorganic non-metallic solid can be varied over a broad range. Preferable, an average particle size of the inorganic non-metallic solid is chosen which is similar to the average particle size of the aluminium-based substrate particles. In a preferred embodiment, the average particle size of the inorganic non-metallic solid and the average particle size of the aluminium-based substrate particles do not differ by more than 30%, more preferably do not differ by more than 15%. In a preferred embodiment, the inorganic non-metallic solid has a plate-like morphology and an aspect ratio which differs by less than 30%, more preferably less than 15% from the aspect ratio of the aluminium-based substrate particles.

Preferably, the particulate inorganic non-metallic material is added to the aqueous coating medium in an amount of from 1 wt % to 50 wt %, more preferably from 5 wt % to 45 wt %, or from 15 wt % to 40 wt %, based on the amount of the coated aluminium-based substrate particles.

While adding the particulate inorganic non-metallic material, the aqueous coating composition is preferably stirred so as to effectively mix the inorganic non-metallic solid and the aluminium-based substrate particles.

Preferably, the aqueous coating medium is homogenized (preferably by stirring) for at least 0.5 h after adding the particulate inorganic non-metallic material.

The particulate inorganic non-metallic material added to the aqueous coating medium can be coated or uncoated.

If coated, the one or more coating layers of the particulate inorganic non-metallic material added to the aqueous coating medium can be one or more metal oxide layers, one or more passivation layers, or any combination thereof.

With regard to appropriate passivation layers and preparation methods thereof, reference can be made to the passivation layers of the aluminium-based substrate particles discussed above.

If one or more metal oxide layers are present on the particulate inorganic non-metallic material, these can be prepared via a wet-chemical coating process and/or a gas phase coating process (such as a chemical vapour deposition coating).

Appropriate process conditions for preparing such metal oxide layers, either by wet-chemical coating or gas phase coating, are generally known to the skilled person.

If one or more metal oxide layers are present on the particulate inorganic non-metallic material, the metal oxide can be selected from iron oxides, titanium oxides, aluminium oxides, silicon oxides, chromium oxides, or any mixture or combination thereof.

As mentioned above, the particulate inorganic non-metallic material can be added to the aqueous coating medium during step (i) or can already be present in the aqueous coating medium before the coating step (i) is started. In both options, an iron oxide and/or titanium oxide layer is at least partly provided on the particulate inorganic non-metallic material. Alternatively, the particulate inorganic non-metallic material can be added to the aqueous coating medium after step (i).

As indicated above, the process of the present invention comprises a step (iii) of separating the mixture of the coated aluminium-based substrate particles and the particulate inorganic non-metallic material from the aqueous coating medium and subjecting the separated mixture to a thermal drying step so as to obtain a dry coloured effect pigment material.

The mixture can be separated from the aqueous coating medium by methods commonly known to the skilled person.

Preferably, the mixture of the coated aluminium-based substrate particles and the particulate inorganic non-metallic material is separated from the aqueous coating medium by filtration, optionally followed by washing the mixture with a washing liquid (such as water or an alcohol).

Appropriate drying conditions so as to obtain a dry coloured effect pigment material can easily established by the skilled person. The thermal drying in step (iii) can be accomplished e.g. by calcination at a temperature of at least 150° C., or at least 200° C., or at least 250° C. A preferred temperature range can be from 150° C. to 500° C., more preferably 200° C. to 300° C.

The calcination can be carried out in air atmosphere. However, it is also possible to carry out the thermal drying step in an inert atmosphere such as nitrogen, or in an atmosphere of a reductive gas such as ammonia.

Preferably, after separation from the aqueous coating medium the mixture of the coated aluminium-based substrate particles and the particulate inorganic non-metallic material is not subjected to a heat treatment in a liquid medium before the thermal drying step.

Optionally, the process further comprises a pigment surface modification step (iv) wherein the dry coloured effect pigment material of step (iii) is brought into contact with a surface-modifying agent, e.g. with a surface-modifying agent having a functional group which is reactive to the surface of the dry coloured effect pigment material.

For the pigment surface modification step, the dry coloured effect pigment material can be provided in a liquid medium containing at least one surface-modifying agent. However, it is also possible to bring the surface-modifying agent into contact with the dry coloured effect pigment material of step (iii) via the gas phase.

Methods for surface modification of effect pigments and appropriate surface modifying agents such as silanes having surface-reactive functional groups (e.g. alkoxysilanes etc.) are known to the skilled person and may improve compatibility of the effect pigment material with the varnish or lacquer. Surface modification methods and agents are described e.g. in EP 1 682 622, EP 1 904 587 and EP 0 688 833.

The present invention also relates to a coloured effect pigment which is obtainable or obtained by the process as described above.

In the following Examples, the present invention will be discussed in further detail.

EXAMPLES

Preparation of Effect Pigment Samples E1 to E3

Aluminium platelets having a $SiO_2$ passivation layer (which was prepared according to step (a) of Example 1 of EP 0 708 154) are dispersed in water.

The suspension of passivated aluminium in water is heated to 80° C. By adding iron nitrate over a period of about 12 to 48 hours, an iron(III) oxide coating is applied onto the passivated aluminium. The pH is adjusted to a range of 2.5 to 4 by adding a base (NaOH, $NH_3$, $NaHCO_3$). The iron oxide coating has a layer thickness which results in $2^{nd}$ order interference.

The suspension of iron oxide coated aluminium platelets is stirred for 30 minutes, followed by adjusting pH to a value of about 2.8 to 3.2 and adding in varying amounts, as indicated in Table 1, mica which is coated with iron oxide.

TABLE 1

Weight ratio of Al-based pigment particles to mica in samples E1-E3

| Sample | Weight ratio of Al-based pigment particles (Al/SiO2/Fe2O3) to mica |
|---|---|
| E1 | No mica added |
| E2 | 80/20 |
| E3 | 70/30 |

After having added the mica, the dispersion is stirred for about one hour so as to ensure a high degree of homogeneity, followed by filtration and washing the mixture of Al-based pigment particles and mica with water.

Finally, the mixture of Al-based pigment particles and mica is subjected to a drying step at a temperature of about 300° C.

Fire propagation rates of these mixtures were measured according to "Transport of Dangerous Goods", *Manual of Tests and Criteria*, $2^{nd}$ revised edition, Part III, Test N.1, Section 33.2.1.4.

The results are shown below in Table 2.

TABLE 2

Fire propagation rates

| Sample | Fire propagation rates |
|---|---|
| E1 | 1 sec |
| E2 | 94 sec |
| E3 | Short lightening and then immediately extinguishing |

For evaluating the homogeneity of the mixture of iron oxide coated Al-based pigment particles and mica particles after separation from the aqueous coating medium, the filter cake of sample E2 was chemically analyzed for its content of Al, Si and Fe at three different locations; i.e. upper part, middle part and lower part of the filter cake. The results are shown in Table 3:

TABLE 3

Chemical analysis of filter cake of E2

| Location in filter cake chemically analyzed | Amount Al (%) | Amount Si (%) | Amount Fe (%) |
|---|---|---|---|
| Upper part | 17.7 | 6.6 | 40 |
| Middle part | 17.6 | 6.6 | 39 |
| Lower part | 17.6 | 6.6 | 39 |

The data of Table 3 clearly demonstrate that a very homogeneous mixture is obtained. However, due to this high homogeneity, the mica particles are evenly distributed throughout the mixture and can effectively suppress a thermite reaction during the thermal drying step of the wet filter cake.

Furthermore, due to this high mixture homogeneity, there is also a high colour homogeneity throughout the effect pigment material.

The invention claimed is:

1. A process for preparing a coloured effect pigment having an aluminum-based substrate particle and an iron oxide or titanium oxide layer, the process comprising:
   (i) coating aluminium-based substrate particles in a liquid aqueous coating medium with at least one metal oxide layer comprising at least one of a titanium oxide and an iron oxide,
   (ii) adding a particulate inorganic non-metallic material to the liquid aqueous coating medium to obtain a mixture of the coated aluminium-based substrate particles and the particulate inorganic non-metallic material in the liquid aqueous coating medium,
   (iii) separating the particulate mixture of the coated aluminium-based substrate particles and the particulate inorganic non-metallic material from the liquid aqueous coating medium, and
   (iv) thermally drying the separated particulate mixture to obtain the coloured effect pigment as a dry material.

2. The process according to claim 1, wherein the aluminium-based substrate particles comprise an aluminium or aluminium alloy core which is optionally at least partly coated with one or more passivation layers.

3. The process according to claim 2, wherein the aluminium-based substrate particles comprise a passivation layer and the passivation layer is at least one of a metal phosphate layer and an inorganic oxide layer.

4. The process according to claim 1, wherein a thickness of the metal oxide layer is such that $1^{st}$ order or $2^{nd}$ order interference is obtained.

5. The process according to claim 1, wherein the particulate inorganic non-metallic material is at least one selected from the group consisting of a sheet silicate, a layered silicate, an aluminium oxide, an aluminosilicate, glass, perlite, synthetic mica, and borosilicate glass.

6. The process according to claim 1, wherein the particulate inorganic non-metallic material added to the liquid aqueous coating medium is not coated.

7. The process according to claim 1, wherein the particulate inorganic non-metallic material added to the liquid aqueous coating medium is coated with at least one metal oxide layer.

8. The process according to claim 1, wherein the particulate inorganic non-metallic material is added to the liquid aqueous coating medium during (i) and/or is already present in the liquid aqueous coating medium before (i) is carried out.

9. The process according to claim 1, wherein the particulate inorganic non-metallic material is added to the liquid aqueous coating medium after (i).

10. The process according to claim 1, wherein the particulate inorganic non-metallic material is added to the liquid aqueous coating medium in an amount of from 1 wt % to 50 wt %, based on the amount of the aluminium-based substrate particles.

11. The process according to claim 1, wherein an average particle diameter of the aluminium-based substrate particles and an average particle diameter of the particulate inorganic non-metallic material do not differ by more than 30%.

12. The process according to claim 1, wherein the mixture of the coated aluminium-based substrate particles and the particulate inorganic non-metallic material is separated from the liquid aqueous coating medium by filtration.

13. The process according to claim 1, wherein the thermal drying comprises calcination at a temperature of at least 150° C.

14. The process according to claim 1, further comprising a pigment surface modification wherein the dry coloured effect pigment material is brought into contact with a surface-modifying agent.

* * * * *